United States Patent [19]
Yokota

[11] Patent Number: 5,202,871
[45] Date of Patent: Apr. 13, 1993

[54] FOCUS SERVO CONTROL DEVICE
[75] Inventor: Hachiro Yokota, Iwaki, Japan
[73] Assignee: Alpine Electronics, Inc., Tokyo, Japan
[21] Appl. No.: 765,338
[22] Filed: Sep. 25, 1991
[30] Foreign Application Priority Data
  Oct. 4, 1990 [JP] Japan .................................. 2-266859
[51] Int. Cl.$^5$ ............................................. G11B 7/095
[52] U.S. Cl. ................................... 369/44.29; 369/54
[58] Field of Search ............... 369/44.25, 44.27, 44.29, 369/44.34, 44.35, 54; 250/201.5

[56] References Cited
U.S. PATENT DOCUMENTS

| | | |
|---|---|---|
| 4,866,690 | 9/1989 | Tamaru et al. |
| 5,010,538 | 4/1991 | Takeda et al. ............... 369/44.29 X |
| 5,103,439 | 4/1992 | Bierhoff et al. ............. 369/44.29 X |
| 5,113,384 | 5/1992 | McDonald et al. ........... 369/44.29 |
| 5,136,566 | 8/1992 | Iwazaki ....................... 369/44.29 X |
| 5,146,442 | 9/1992 | Skikichi ...................... 369/44.29 |
| 5,157,644 | 10/1992 | Rokutan ...................... 369/44.29 X |

Primary Examiner—W. R. Young
Attorney, Agent, or Firm—Guy W. Shoup; Patrick T. Bever

[57] ABSTRACT

A focus servo control device is provided with a focus search signal generating portion for generating a focus search signal whose first half cycle is short and whose second half cycle is long, a level detecting portion for detecting the level of a focus error signal when an object lens first passes near the focus point in response to the focus search signal, a gain adjusting portion for adjusting the focus servo gain based on the detected focus signal level, and a signal switch circuit for outputting a focus error signal instead of the focus search signal when the object lens reaches the focus point or the adjacency of the focus point for a second time in response to the focus search signal. The object lens is moved to a position where the focus servo control can be performed in response to the focus search signal, and then focused on the surface of a disc in response to the focus error signal in accordance with the distance between the object lens and the disc surface.

4 Claims, 4 Drawing Sheets

5,202,871

FOCUS SERVO CONTROL DEVICE

BACKGROUND OF THE INVENTION

1. Field of the Invention

The present invention relates to a focus servo control device, and more particularly, to a focus servo control device which shortens the time needed to prepare for focus servo control by shortening focus gain adjustment time.

2. Description of the Related Art

In a compact disc (CD) player, the focal depth of an object lens for focusing a laser beam on the surface of a disc is approximately only ±0.1μm. Therefore, the CD player is provided with a focus servo control device which generates a focus error signal having a voltage value corresponding to the distance between the object lens and the disc, performs focus servo control based on the focus error signal, and controls the position of the object lens with respect to the surface of the disc so that the above distance is constant, in other words, so that the surface of the disc accords with a focal plane.

FIG. 4 schematically explains the focus servo control in which a focus error signal FE is generated by using a photodetector PD divided into four diodes in astigmatism. (1) In focus (when the object lens is focused on the surface of the disc), a beam image on the photodetector PD has a circular shape as shown in FIG. 4(a). (2) When the object lens is too close to the reflecting surface of the disc, a beam image on the photodetector PD is in the shape of a longitudinal ellipse as shown in FIG. 4(b). (3) When the distance between the object lens and the reflecting surface is too long, a beam image on the photodetector PD is in the shape of a laternal ellipse as shown in FIG. 4 (c).

Therefore, if a composite current of first and third photodiodes D1 and D3 is converted into voltage by an I-V converter (current-voltage converter) 1 and input to a + terminal of a subtracting circuit 3 in the next stage, and a composite current of second and fourth photodiodes D2 and D4 is converted into voltage by an I-V converter 2 and input to a − terminal of the subtracting circuit 3, a focus error signal FE in accordance with the distance between the disc reflecting surface and the object lens is output from the subtracting circuit 3 as shown in FIG. 4(d). Since the focus error signal FE is 0 in focus, the focus servo control is performed so that FE is 0, in other words, so that the object lens is focused on the disc reflecting surface.

In order to allow the focus servo control device to perform focus servo control, it is necessary that the distance between the object lens and the disc reflecting surface be somewhat close to the focal depth. It is thus necessary to move the object lens to a position where the focus servo control can be performed when the disc is set on a turntable. Therefore, a focus search signal which is a triangular signal of approximately ½ Hz is generated, the object lens is moved to the focus servo control possible position, for example, the focus position (focus search control), and then, the focus servo control is carried out according to a focus error signal.

Since the level (peak value) of the focus error signal FE varies depending upon variations of discs and the temperature characteristic of an optical pickup, the focus servo control device does not fix the focus servo gain. It does detect the focus servo signal level, determines the attenuator value based on the detected level, and automatically obtains an optimum focus servo gain. This determination of the focus servo gain is performed simultaneously with the focus search control.

In other words, a focus search signal FS, which is a triangular wave signal of (½)Hz, is generated in a focus search as shown in FIG. 5, and the object lens is vertically moved in response to the focus search signal so as to come close to and then move away from the disc surface. In this vertical movement, the peak level $L_P$ of a focus error signal FE when the object lens first passes near the focus position ($t_1$) is detected, the attenuator value is set based on the detected peak level, and the focus serve gain is adjusted. Furthermore, after the object lens reaches the focus position for a second time ($t_2$), the focus servo control is performed according to the focus error signal FE instead of the focus search signal FS.

However, such a conventional method has the disadvantage in that it takes a period corresponding to one cycle of a focus search signal (2 seconds) to prepare for focus servo control since it is necessary to determine the focus servo gain, and thus sound is not output immediately. Although it is possible to shorten the cycle of the focus search signal in order to eliminate the above disadvantage, in this case, the moving velocity of the object lens in transition from the focus search to the focus servo control is made higher. In other words, the signal width of the focus error signal is made smaller and it is not possible to reliably prepare for the focus servo control.

SUMMARY OF THE INVENTION

An object of the present invention is to provide a focus servo control device capable of reliably preparing for focus servo and shortening the focus servo preparation time.

In order to achieve the above object, a focus servo control device of the present invention comprises a focus search signal generating portion for generating a focus search signal having a short first half cycle in which the amplitude is large, and a long second half cycle in which the amplitude is small, a level detecting portion for detecting the level of a focus error signal when an object lens first passes near the focus point in response to the focus search signal, a gain adjusting portion for adjusting the focus servo gain based on the detected focus signal level, and a signal switch circuit for outputting a focus error signal instead of the focus search signal when the object lens reaches the focus point or the adjacency of the focus point for a second time in response to the focus search signal.

The first half cycle of the focus search signal is short and the amplitude therein is large, and the second half cycle is long and the amplitude therein is small. The moving velocity of the object lens is, thereby, increased in the first half cycle and decreased in the second half cycle. Furthermore, the level of the focus error signal when the object lens passes near the focus point at high speed is detected, and the focus servo gain is determined based on the detected level. Therefore, the time required for the determination of the focus servo gain can be shortened. Furthermore, since the object lens slowly reaches the focus point or the adjacency of the focus point after the focus servo gain is determined, it is possible to reliably prepare for the focus servo control.

DETAILED DESCRIPTION OF THE PREFERRED EMBODIMENT

(a) General Construction

Figure 1:
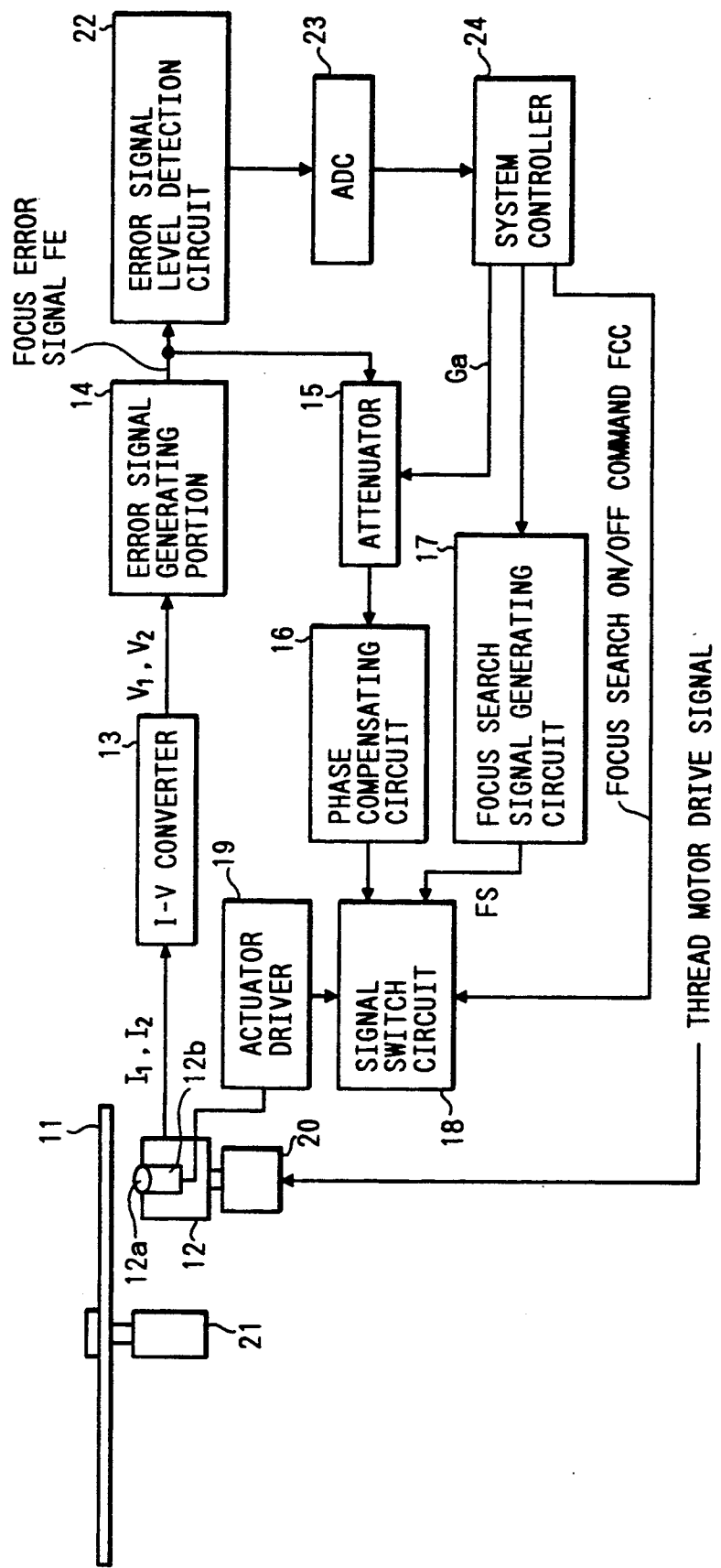
FIG. 1 is a schematic view showing the construction of a focus servo control device according to the present invention.

FIG. 1 shows the construction of a focus servo control device according to the present invention. The focus servo control device is constituted by a compact disc (CD) 11; an optical pickup 12 having an object lens 12a, a focus actuator 12b for moving the object lens 12a, a four-divided photodiode (not shown) and so on; an I-V converter 13 for converting a composite current $I_1$ of first and third photodiodes of the four-divided photodiode and a composite current $I_2$ of second and fourth photodiodes into voltages $V_1$ and $V_2$, respectively; an error signal generating portion 14 for calculating the difference between the voltages $V_1$ and $V_2$ and outputting a focus error signal FE; an attenuator 15 for controlling the focus servo gain based on an attenuator value Ga, described below; a phase compensating circuit 16; a focus search signal generating circuit 17 for generating a focus search signal FS; a signal switch circuit 18 for selecting and outputting the focus search signal FS or the focus error signal FE; an actuator driver 19 for driving the focus actuator 12b based on the focus error signal FS or the focus search signal FS so as to control the distance between the object lens 12a and the reflecting surface of the CD 11; a thread motor 20; and a spindle motor 21.

An error signal level detection circuit 22 detects the level (peak value) of a focus error signal FE when the object lens 12a first passes near the focus point in response to a focus search signal FS, and an AD converter (ADC) 23 converts the detected focus error signal level into a digital value. A system controller 24 carries out the focus servo control, the determination of the attenuator value Ga, and so on.

(b) Focus Search Signal Generating Circuit

Figure 2:
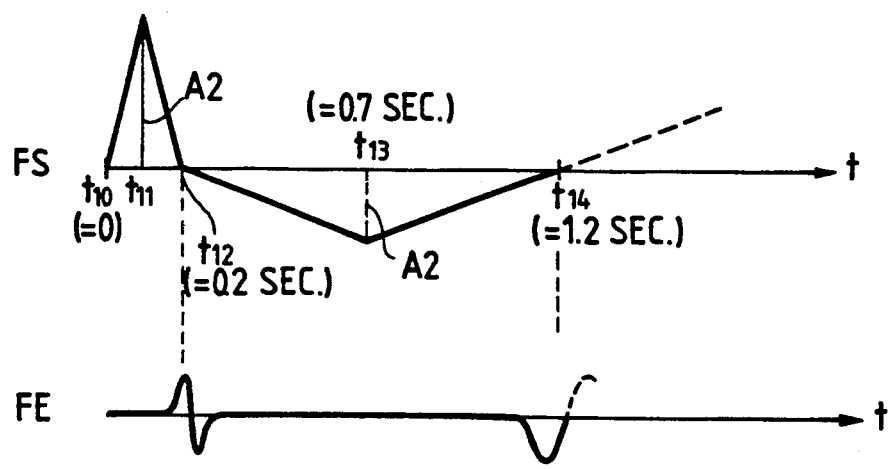
FIG. 2 is a wave form chart of a focus search signal and a focus error signal.

The focus search signal generating circuit 17 generates a focus search signal FS shown in FIG. 2. In other words, the first half of the cycle of the focus search signal FS is short (the first half cycle=0.2 second) and the amplitude A1 is large in the first half cycle, and the second half cycle is long (the second half cycle=1.0 second) and the amplitude A2 is small in the second half cycle.

Figure 3:
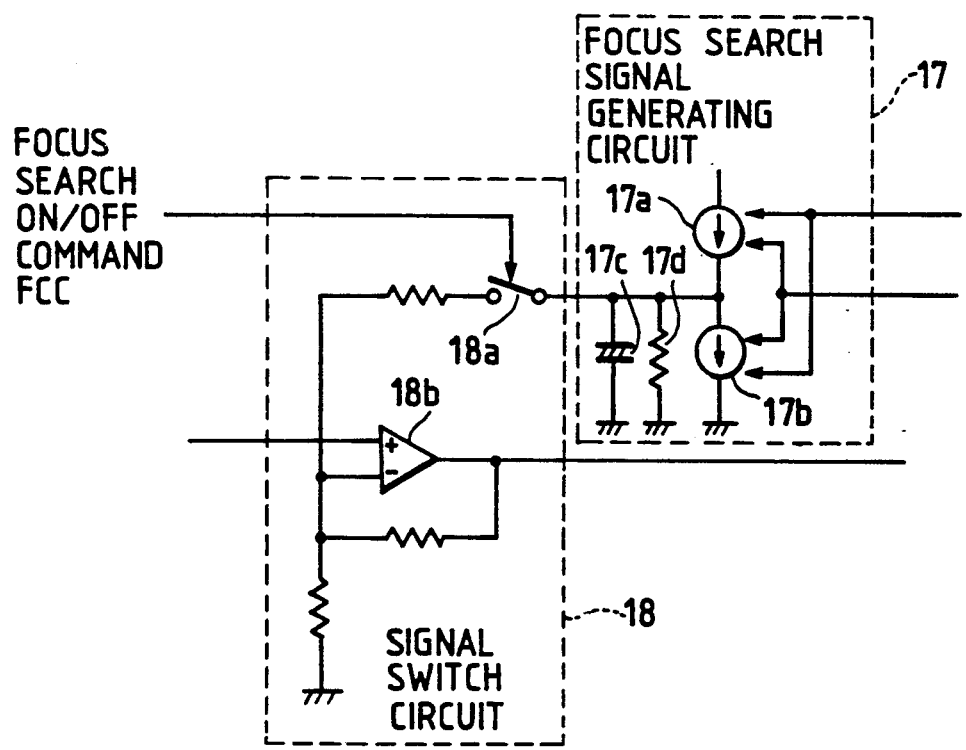
FIG. 3 is a view showing the constructions of a focus search signal generating circuit and a signal switch circuit.
Figure 4A:
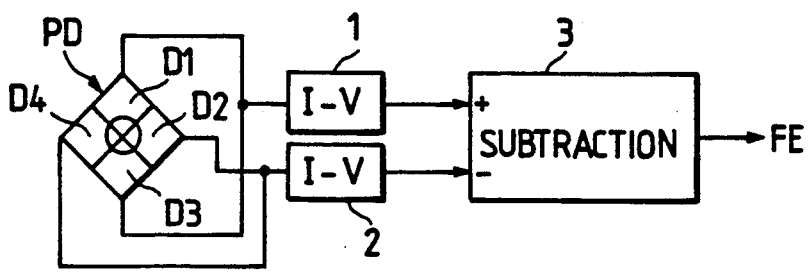
FIG. 4(a-d) is an explanatory view of focus servo control.
Figure 4B:
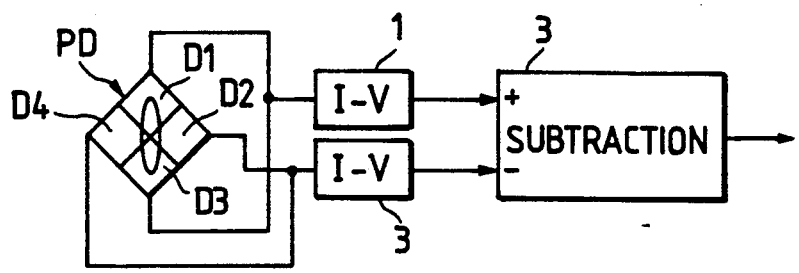
Figure 4C:
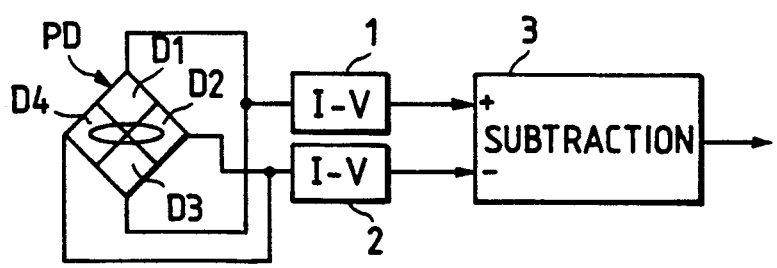
Figure 4D:
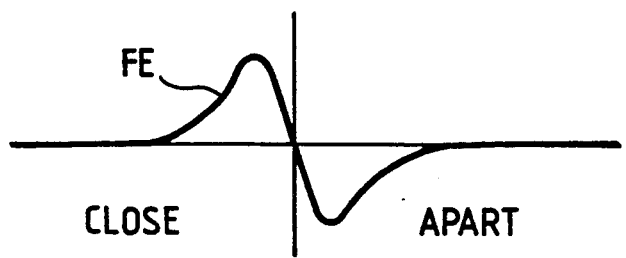
Figure 5:
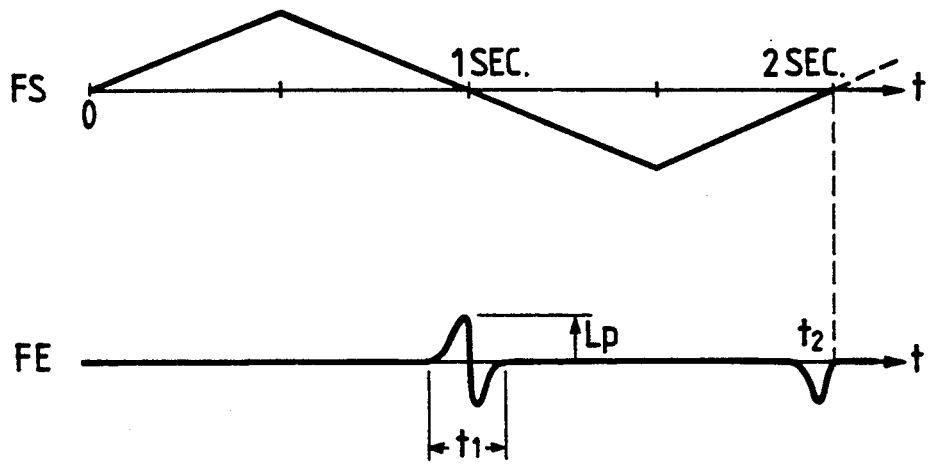
FIG. 5 is a wave form chart of conventional focus search and focus error signals.

FIG. 3 is a circuit diagram of the focus search signal generating circuit 17 and the signal switch circuit 18. The focus search signal generating circuit 17 is constituted by a +current source 17a, a -current source 17b, an integral condenser 17c and a discharging resistor 17d. The signal switch circuit 18 is constituted by a switch 18a for signal selection and a signal synthesizing portion 18b. The + and - current sources 17a and 17b each are appropriately turned on and off under the control of the system controller 24, and a current value of each source is set at $I_1$ or $I_2$ ($I_2 < I_1$), thereby outputting a focus search signal FS shown in FIG. 2.

In other words, in the focus search control, the system controller 24 outputs a focus search on command so as to actuate the switch 18a and controls the + current source 17a so as to output the current $I_1$ (time $t_{10}$). As a result, the current $I_1$ linearly charges the integral condenser 17c, and thus the amplitude of the focus search signal FS is A1 at the time $t_{11}$ (=0.1 second).

At the time $t_{11}$, the system controller 24 turns off the + current source 17a, and turns on the − current source 17b instead so as to output the current $I_1$. The integral condenser 17c is thereby linearly discharged and the focus search signal FS becomes 0 at the time $t_{12}$.

At the time $t_{12}$, the system controller 24 controls the − current source 17b so as to change the current $I_1$ to $I_2$. As a result, the integral condenser 17c is linearly and negatively charged with a relative gentle slope after the change, and the amplitude of the focus search signal FS becomes A2 (<A1) at the time $t_{13}$ (=0.7 second).

At the time $t_{13}$, the system controller 24 turns off the − current source 17b and controls the + current source 17a instead so as to output the current $I_2$. Thereby, the focus search signal FS starts to linearly rise relatively gently, and reaches 0 at the time $t_{14}$ (=1.2 second). At this time, the system controller 24 outputs a focus search off command, turns the switch 18a off and completes the focus search control. Furthermore, the system controller 24 also turns off the + and − current sources 17a and 17b simultaneously. The focus search signal FS shown in FIG. 2 is output by the above operation.

(c) General Operations

General operations of the focus servo control device will now be described.

When a disc is set in a player, the system controller 24 immediately carries out the focus search control. In other words, the system controller 24 outputs a focus search on command so as to turn on the switch 18a, and performs the above-mentioned focus search signal generation control.

As a result, the object lens 12a comes close to and then moves away from the disc reflecting surface at a relatively high speed in the first half cycle, and passes the focus position 0.2 second after the start of the control. At this time, the focus error signal FE shown in FIG. 2 is output from the error signal generating portion 14.

The error signal level detection circuit 22 detects the peak value of the focus error signal FE, and the AD converter 23 converts the peak value into a digital value and inputs the digital value to the system controller 24.

The system controller 24 determines the attenuator value Ga for setting the focus servo gain at an optimum value based on the difference between the input peak value and a preset optimum value, inputs the attenuator value Ga to the attenuator 15, and adjusts the focus servo gain to an optimum value.

In the second half cycle, the object lens 12a continues to slowly retreat, stops at the time $t_{13}$, and then starts again to approach the disc reflecting surface at low speed. When the object lens reaches the focus position at the time $t_{14}$ (=1.2 second) (the focus error signal FE=0), a focus search off command is output, the switch 18a is turned off and the focus search control is switched to the focus servo control. It is also possible to switch the focus search to the focus servo control when the object lens 12a reaches the adjacency of the focus point.

As described above, according to the present invention, since the focus search is performed in the short first half cycle of a focus search signal in which the amplitude is large, and in the long second half cycle in which the amplitude is small, it is possible to move the object lens at high speed in the first half cycle in which the servo gain is determined and to move the object lens at low speed in the second half cycle in which the focus servo control is prepared. It is thus possible to shorten the time required for the determination of the focus servo gain and the focus search, and to reliably prepare for the focus servo control.

What is claimed is:

1. A focus servo control device which moves an object lens to a position where the focus servo control can be performed in response to a focus search signal, and then focuses said object lens on a reflecting surface of a disc in response to a focus error signal in accordance with the distance between said object lens and said disc reflecting surface, comprising:
    a focus search signal generating portion for generating a focus search signal whose first half cycle is short and whose second half cycle is long;
    a level detecting portion for detecting the level of a focus error signal when said object lens first passes near the focus point in response to the focus search signal;
    a gain adjusting portion for adjusting the focus servo gain based on the detected focus signal level; and
    a signal switch circuit for outputting a focus error signal instead of the focus search signal when said object lens reaches the focus point or the adjacency of the focus point for a second time in response to the focus search signal.

2. A focus servo control device according to claim 1, wherein said focus search signal generating portion generates the focus search signal whose amplitude is large in the first half cycle and small in the second half cycle.

3. A focus servo control method which moves an object lens to a position where the focus servo control can be performed in response to a focus search signal, and then focuses said object lens on a reflecting surface of a disc in response to a focus error signal in accordance with the distance between said object lens and said disc reflecting surface, comprising the steps of:
    generating a focus search signal whose first half cycle is short and whose second half cycle is long;
    detecting the level of a focus error signal when said object lens first passes near the focus point in response to the focus search signal;
    adjusting the focus servo gain based on the detected focus signal level; and
    outputting a focus error signal instead of the focus search signal when said object lens reaches the focus point or the adjacency of the focus point for a second time in response to the focus search signal.

4. A focus servo control method according to claim 3, wherein the amplitude of the focus search signal is large in the first half cycle and small in the second half cycle.

* * * * *